United States Patent [19]

Borland et al.

[11] Patent Number: 5,156,338

[45] Date of Patent: Oct. 20, 1992

[54] SPRAYSHIELD ATTACHMENT FOR A FIELD SPRAYER

[76] Inventors: John Borland; Thomas E. Northam, Box 2140, Winkler, Manitoba, Canada, R0G 2X0

[21] Appl. No.: 623,776

[22] Filed: Dec. 7, 1990

[51] Int. Cl.⁵ .......................... B05B 1/28; B05B 15/04
[52] U.S. Cl. .................................. 239/288; 239/159; 425/504
[58] Field of Search .............. 239/288, 288.3, 288.5, 239/150, 159, 163, 164, 165, 166, 167, 168, 172; 24/301, 324, 706.2; 403/265, 266; 47/1.7; 425/504, 517; 428/65, 137

[56] References Cited

U.S. PATENT DOCUMENTS

| | | | |
|---|---|---|---|
| 3,158,324 | 11/1964 | Oehler et al. | 239/159 |
| 3,512,714 | 5/1970 | Phelps et al. | 239/159 |
| 3,875,280 | 4/1975 | Story | 425/504 |
| 4,274,589 | 6/1981 | Jones. | |
| 4,353,505 | 10/1982 | Kinder | 239/167 |
| 4,629,123 | 12/1986 | Gorder | 239/159 |
| 4,641,781 | 2/1987 | McCrea et al. | |
| 4,646,971 | 3/1987 | Rogers. | |
| 5,012,608 | 5/1991 | Brown | 239/159 |

Primary Examiner—Andres Kashnikow
Assistant Examiner—Christopher G. Trainor
Attorney, Agent, or Firm—Adrian D. Battison; Murray E. Thrift; Stanley G. Ade

[57] ABSTRACT

A spray shield for a field sprayer includes a front skirt and a rear skirt each extending along a plurality of nozzles of the field sprayer. For each nozzle there is provided a dome-shaped enclosure which is attached to the front and rear skirt and extends therefrom upwardly toward the nozzle so that between each enclosure and the next there is defined a V-shaped through which prevailing winds can pass. The dome enclosure terminates at an edge surrounding an opening with the edge lying in a plane below the height of the top of the nozzle so that an initial portion of the spray pattern is exposed to view above the dome enclosure while an open portion of the spray pattern is protected by the dome enclosure and by the skirts from the prevailing winds.

19 Claims, 6 Drawing Sheets

SPRAYSHIELD ATTACHMENT FOR A FIELD SPRAYER

BACKGROUND OF THE INVENTION

This invention relates to a field sprayer and more particularly to a shield attachment to the sprayer to improve the spraying action.

Field sprayers have become a very important item of agricultural equipment as the use of agricultural chemicals has increased.

Conventional field sprayers are of the type having an elongate support frame for transport across field transverse to the length of the frame, a liquid supply boom extending longitudinally of the frame and a plurality of nozzles along the length of the boom for spraying the field.

Generally, sprayers of this type have a pair of such booms extending outwardly from a central wheeled truck sections supporting the tanks that supply the liquid to be sprayed. On this framework, 60' to 100' in length, spray booms are supported at one or two positions by ground wheels.

Spray covers are well known and regularly used on agricultural sprayers, however their effectiveness may vary. Sprayers are open to the elements, especially the wind so that spray drift is a problem at all times and at wind velocities greater than very low speeds effectively prevents use of the equipment. A number of spray covers or enclosures have been developed to reduce the wind effect on spray drift during spraying. There are many devices that fully enclose a spraying area from the ground up to and including the sprayer nozzles. Even with such fully enclosed devices, spray drift however is still a problem with many designs of sprayshield. In addition, in view of the expense and complication and the reduced access available with fully enclosed systems, many designs of reduced size of cover have been proposed. These designs are however, in many cases, ineffective and still do not provide access to the enclosed spray nozzles for routine maintenance or repair.

A review of the prior art discloses a number of spray cover devices, all of which claim to minimize wind drift, each with a varying degree of success (U.S. Pat. No. 4,646,971; U.S. Pat. No. 4,641,781 and U.S. Pat. No. 4,272,589). In each case, the spray nozzles are within the device and quick maintenance of, for example a plugged nozzle, is not easily accomplished. Also, since the nozzles are not visible, the operator may continue to spray the field for a long time without realizing that a spray nozzle is faulty thus leading to areas of reduced spray or areas of increased spray, both of which can be equally damaging to the crop.

Modern spray material may be considered a hazzard to people's health and other life forms. It may also be harmful to a crop in excess. If a crop is not sprayed, the crop may also suffer as it will then be susceptible to weed growth or insect attack. A properly operating sprayer is essential to overcome these potential hazzards.

U.S. Pat. No. 4,646,971 (Rogers) discloses an arrangement in which the spray nozzle is mounted exteriorly of the shield but the mouth of the nozzle and the whole of the spray pattern are fully covered by the shield so that the pattern is not visible.

A design by Brandt shown in their brochure entitled Hydraulic Quick-Folding Field Sprayers provides a short length shield known as a "Windlore" (trademark) covering only the nozzle and a part of the pattern. However this has little effect on the drift problem.

A design, by Bourgault shown in their brochure entitled "Air curtain" comprises a device intended to develop a air curtain by jetting air downwardly in front of and behind the pattern.

Flexicoil as shown in their brochure entitled "Sprayer Windscreen" provides a device which has openings through the shield.

None of these devices however allows viewing of and easy access to the nozzle and none utilizes properly air flow around the area of the pattern to properly protect the pattern.

SUMMARY OF THE INVENTION

It is one object of the present invention therefore to provide an improved sprayshield attachment which overcomes or alienates the above problems.

According to a first aspect of the present invention there is provided a field sprayer comprising a liquid supply duct, frame means mounting a liquid supply duct in a substantially horizontal orientation for transportation across a field in a direction generally at right angles to the duct; a plurality of spray nozzles mounted on the duct at spaced positions there along so as to direct liquid in a spray pattern downwardly from the duct, each of the nozzles having a nozzle tip from which the spray pattern emerges; and a sprayshield carried by the frame means and including a sprayshield body having walls for protecting the spray pattern from air movement in a direction across the ground, the sprayshield body having an opening adjacent the nozzle, the opening being defined by wall edge means of the body, at least one part of the wall edge means being arranged at a height lower than the said tip so as to allow viewing of the tip and the spray pattern from a location outside of the sprayshield.

According to a second aspect of the present invention there is provided a field sprayer comprising a liquid supply duct, frame means mounting a liquid supply duct in a substantially horizontal orientation for transportation across a field in a direction generally at right angles to the duct; a plurality of spray nozzles mounted on the duct at spaced positions there along so as to direct liquid in a spray pattern downwardly from the duct, each of the nozzles having a nozzle tip from which the spray pattern emerges; and a sprayshield carried by the frame means and including a sprayshield body having walls for protecting the spray pattern from air movement in a direction across the ground, the sprayshield body comprising a front skirt portion, a rear skirt portion, each of the said skirt portions extending across the plurality of nozzles, and for each of the nozzles a top portion above the skirt shaped to surround the spray pattern of the nozzle, said top portion integrally attached to the skirt and having walls extending downwardly and outwardly from the opening, the said walls comprising a front wall, a back wall and two side walls, said walls defining a domed enclosure in which the said side walls extend downwardly and outwardly from the opening thereby abutting and joining the side walls extending from and adjacent nozzle opening, said walls thereby defining a channel between the side walls of adjacent domed enclosures on the sprayshield body.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
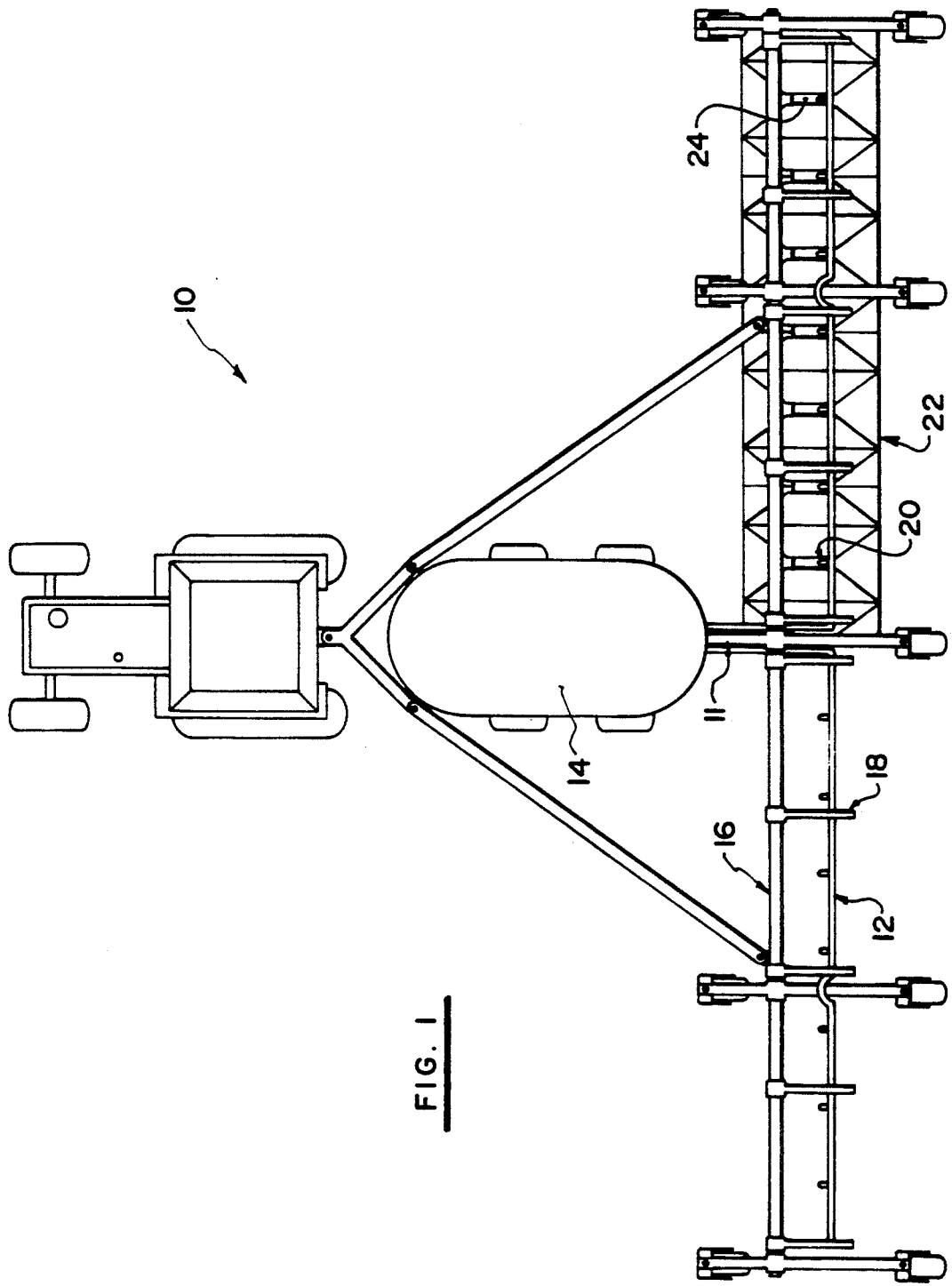
FIG. 1 is a plan view of a field sprayer incorporating a shield arrangement according to the invention with half of the sprayer having the cover sheets removed to show the frame structure.

A conventional field sprayer, comprising a central support truck, including a tank and ground wheels for towing by tractor, is indicated at 10. Other arrangements for providing the central support are well known to those skilled in the art, including a spray tube or a truck mount, and it is understood and appreciated that the invention can be used with any of these arrangements.

The conventional spray boom extends outwardly from the central boom 11 and comprises an elongate support frame mounted on ground wheels. The ground wheels include a walking beam and in many cases and a caster wheel at the front and rear of the walking beam.

A liquid supply tube or boom 12, extends from the tank 14 outwardly along the frame 16 and is supported on a number of brackets 18 which are welded to the frame 16.

A plurality of nozzles 20 are positioned along the tube 12 at suitable locations to provide a fan pattern of spray which is adjusted to provide complete spray coverage of the ground.

A sprayshield 22 attaches, below the boom 12 and frame 16. The shield is multi-surface device formed from molded walls that form an opening 24 on its top surface 25. The opening has four edges, a front edge 26, rear edge 28 and two side edges 30 and 32. The side edges 30 and 32 may be either straight edged or partially arcuate as desired. The preferred embodiment has the rounded edges.

The top of the device that is the edges of the walls defining the opening, and particularly the front edge lies at a height below the nozzles 20 so that the nozzles are entirely exposed when the device is in place and in operation. That is the wall edges are shaped such that an imaginary horizontal line of sight extending from the nozzle tip substantially longitudinally of the frame lies outside the sprayshield and body and is free from intersection with the walls so as to allow viewing of the tip and the initial portion of the spray pattern. Extending down from the front edge 26 of the opening is a forwardly inclined flange 34 with a width equal to that of the opening front edge 26. The flange 34 may also extend above the horizontal plane of the opening 24. In the preferred embodiment, the flange 34 extends ¼" above the horizontal plane of the opening 24.

Extending downwardly from the rear edge 28 of the opening 24 is a second rearwardly inclined flange 36, again with its width equal to that of the width of the rear edge 28.

Figure 2:
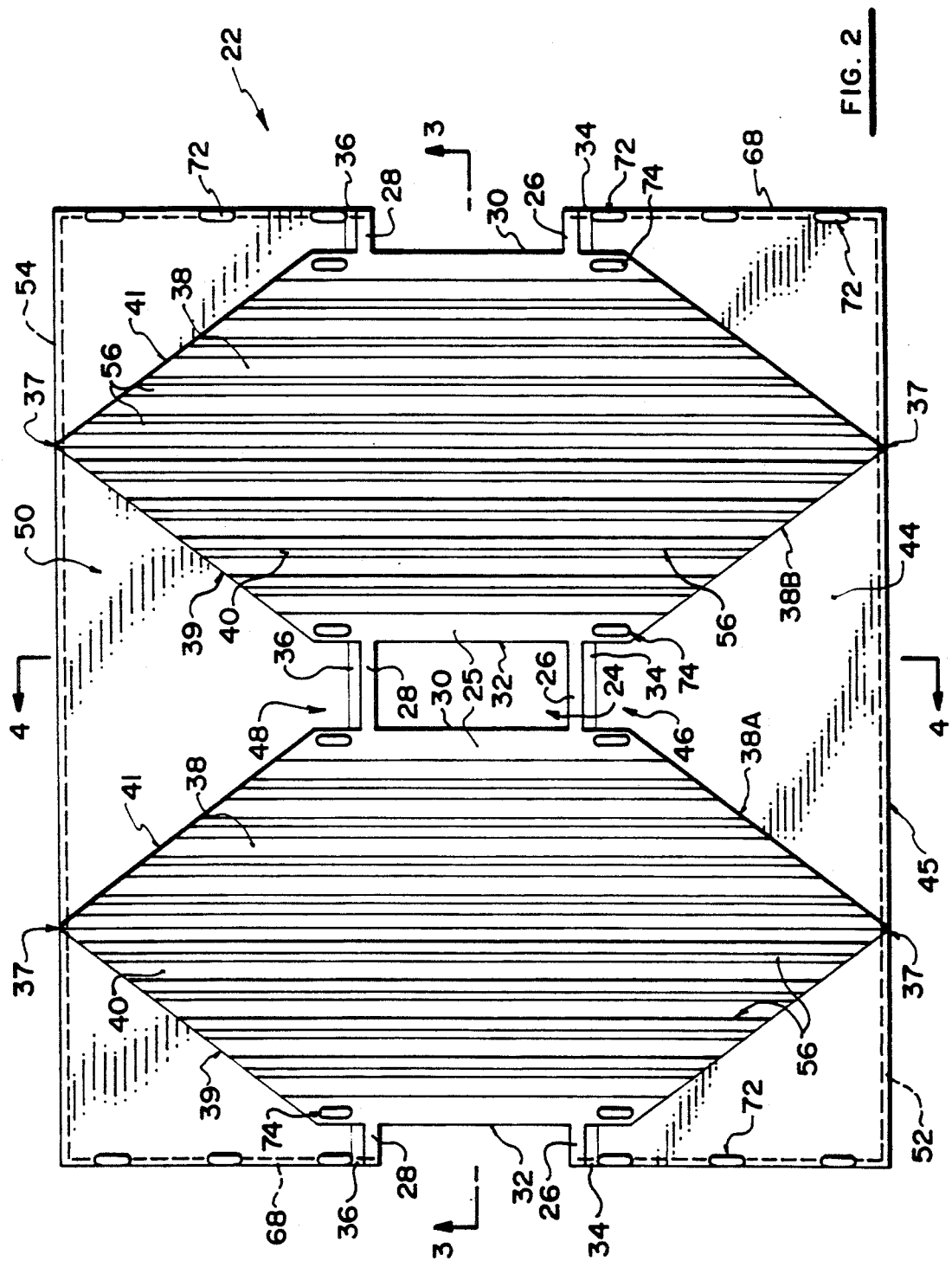
FIG. 2 is a top view of the preferred embodiment.
Figure 3:
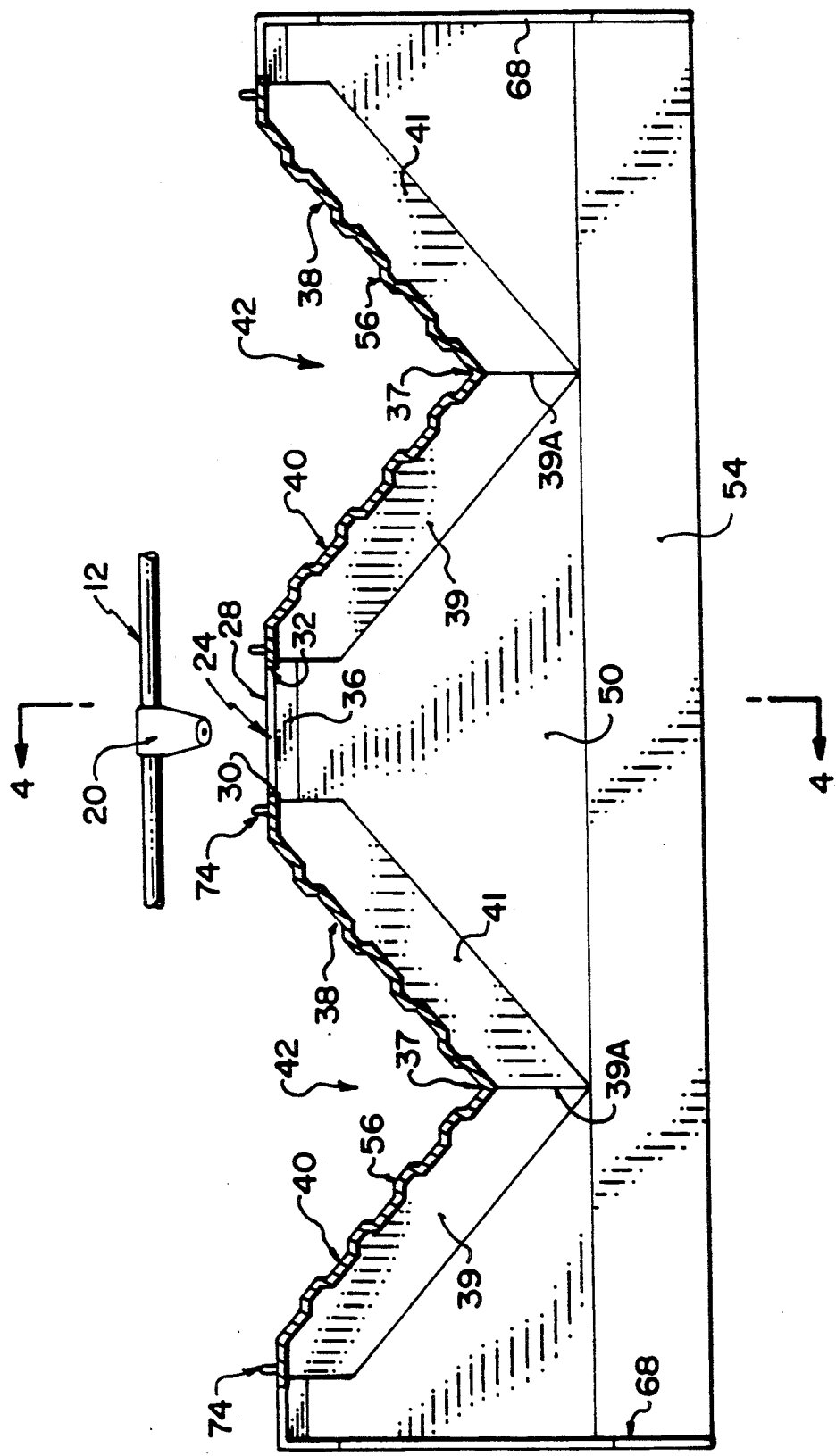
FIG. 3 is a cross sectional side view of the preferred embodiment along the lines 3—3 of FIG. 2.
Figure 4:
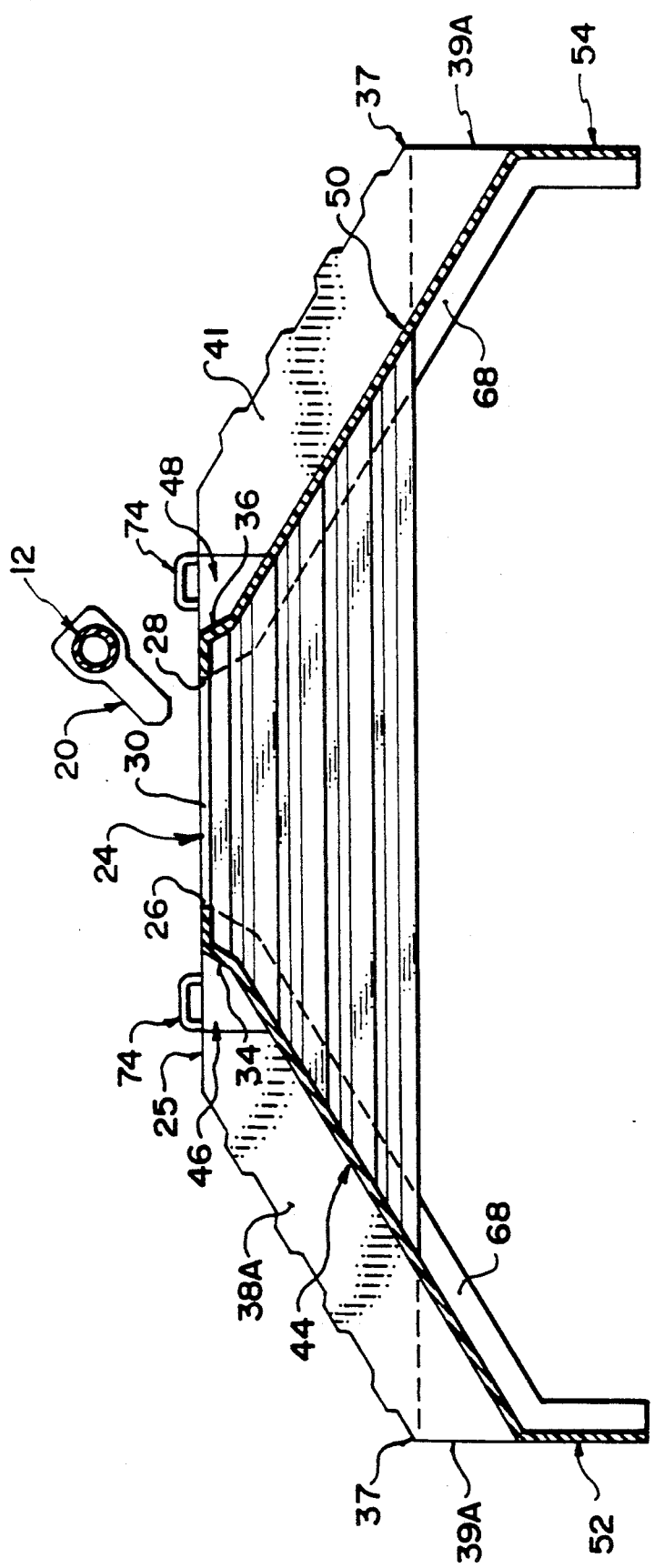
FIG. 4 is a cross sectional view along the lines 4—4 of FIG. 3.
Figure 5:
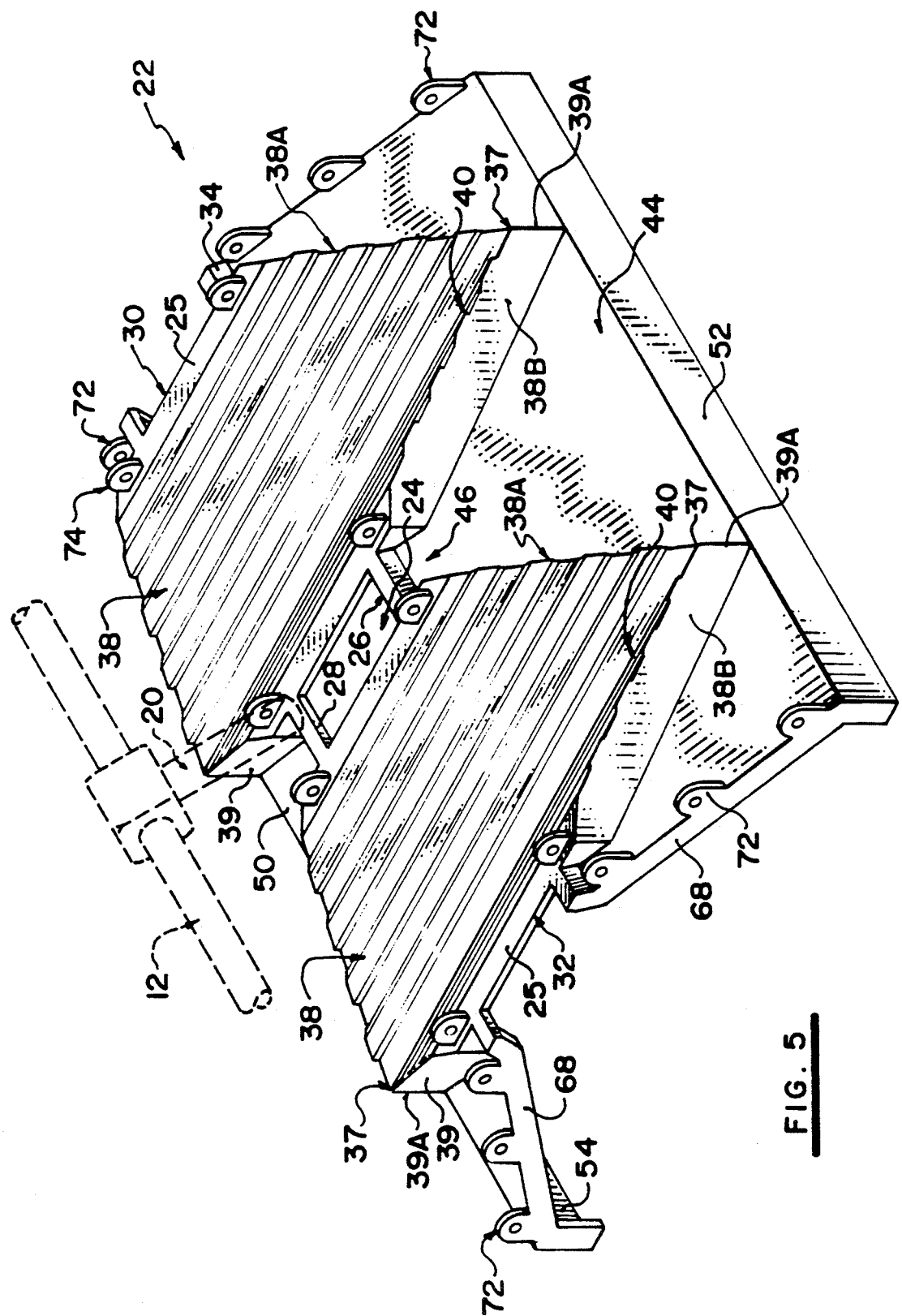
FIG. 5 is a isometric view of the nozzle and opening arrangement on the preferred embodiment of the invention.
Figure 6:
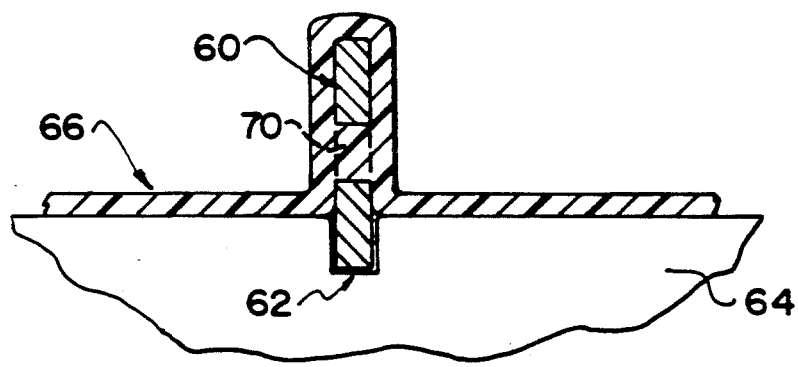
FIG. 6 is a side view of an embedded part within the preferred embodiment.
Figure 7:
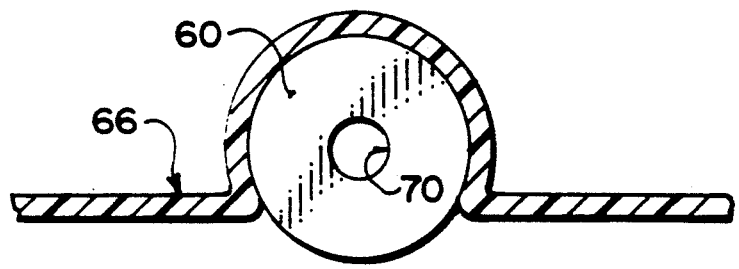
FIG. 7 is a front view of an embedded part within the preferred embodiment.
Figure 8:
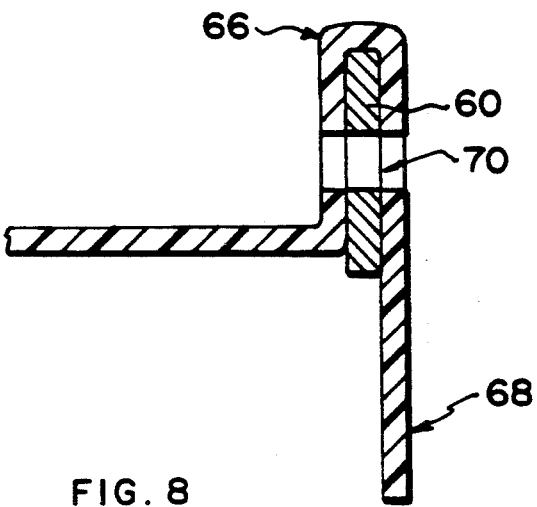
FIG. 8 is a side view of an embedded part on the side edge of the preferred embodiment.

The top surface 25 comprises a horizontal flat plate surrounding the opening 24. Extending from the side of this surface 25 are walls 38 and 40 which are integrally connected to and contiguous with the surface 25. The walls 38 and 40 are tapered and extend downwardly and outwardly as best shown in FIG. 3 from the top surface 25 to a position in which the side wall 38 extending from one opening 24 meets the side wall 40 extending from an adjacent opening 24. When viewed from the front or rear of the device, in cross section, this meeting of the adjacent walls results in a v-shaped channel 42 between the walls 38 and 40. As shown in the plan view of FIG. 2, the walls 38 and 40 have front and rear edges which diverge from the width of the top wall 25 forwardly and rearwardly to intersect the adjacent wall at an apex 37 intermediate the openings 24.

There is extending outwardly and downwardly from the base of flange 34, a front wall 44 which is inclined downwardly and forwardly to a forwardmost edge 45 aligned with an imaginary line interconnecting the apexes 37. On each side edge 38A, 38B of the walls 38 and 40 respectively is provided a vertical wall portion only one of which is visible in the drawings at 39 which extends from the wall 38 downwardly to interconnect with the front wall 44 thus forming a channel between the front edge of the side walls 38 and 40.

A similar arrangement exists with the back of the device, in that the rear flange 36 forms a rear narrow channel 48, in which the rear wall 50 acts as the bottom of the channel between the vertical wall portions of the side walls 38 and 40 one of which vertical portions is visible at 41.

The front wall 44 and a rear wall 50 both extend to a position just below the horizontal plane of the apexes 37 of v-shaped channels 42 defined by the walls 38, 40. From this point, an elongate skirt 52 is attached, which hangs vertically downward therefrom on the front end. An elongate skirt 54 is attached and hung vertically downward from the rear wall 50. The skirts 52 and 54 are of a semi-rigid, flexible construction, that hang to a position very close to the ground when in operation. The aprons 52, 54 are integrally connected with the edges of the front and rear walls 44, 50 respectively and vertical wall portions 39, 41 which converge to a vertical line 39A at the apex 37.

Along a lower lip of the skirts 52 and 54 there is a curved edge. This edge causes the crop entering the device to bend and spray generally, for more effective spray cover, rather than an abrupt collision with a flat edge against the crop. There is less damage to the crop, as well as a better spray coverage thereon.

As seen in FIG. 1, the device may be modular, and comprised of attachable pieces that fit together along the boom 12, adjacent each other. In the embodiment described, each piece has the opening 24 centrally located on top and v-shaped side walls 38 and 40 joining their respective adjacent side walls 40 and 38, at the apex of their respective v extending upwardly to form half of opening 24. The result is the formation of a row of v-like channels between the top openings 24.

On the brackets attaching the boom to the device, there is a transverse rod (not shown) attached to the bracket 18 and the boom 12 so that when raised, the device rotates with the boom and does not hang at all times in the same position.

On the preferred embodiment, the angled side walls 38 and 40 are of a ribbed formation that provides an extra strength to the device. The ribs 56 run from the front to the rear of the device on the side walls 38 and 40 so that wind resistance is kept to a minimum when the oncoming air passes through the v-shaped channel 42.

As mentioned above, the device is modular and comprised of detachable pieces that fit together along the boom 12, adjacent each other. The pieces attached to each other by flanges 68 which depend vertically downwardly from each end of the modular piece for engagement against and connecting to a similar flange on the adjacent modular piece. The flanges are connected by a special fastening means comprised of a washer or ring molded right into the plastic material of the shield at the flange. The shield pieces are also suspended from the boom and held in place by a connecting means through these washers or rings.

The special vacuum formed part is formed by a vacuum suction method when making the plastic shield pieces. The embedded part may be of any shape or design that would provide a means for fastening thereto. It is a washer in the present embodiment, but it could be any shape that allows fastening.

A washer or ring 60 is placed in a slot 62 in a mold insert 64. A plastic sheet 66, that will be molded into a shield attachment, is placed over the washer and mold insert on the mold 68. The plastic sheet 66 is molded by the well known plastic suction technique to become the shield attachment, however, the plastic sheet 66 surrounds the washer 60 in the slot 62. The washer becomes firmly embedded in the plastic sheet 66. The plastic sheet 66 even fills the hole 70 on the ring 60.

When the mold is removed, the plastic piece has an integral embedded washer 60 therein. The plastic within the hole 70 is removed and the result is a integrally attached washer or ring positioned on the shield to accept a means for interconnecting the shield pieces, such as a bolt, or a means for connecting and suspending the shield from a boom. This may be a bolt or a wire.

The washers are embedded on the side edges of the shield at 72 and on the top surface of the shield at 74. The side washer 72 are used to connect the pieces together and the embedded rings on the top of the shield at 74 are used to suspend the shield from the boom.

In operation, the nozzles 20 are positioned above the openings 24 on the device so that when spraying, an initial part of the pattern is exposed, while a later opened part of the pattern enters the opening and disperses at the proper angles within the device between the side walls 38 and 40. As the device is essentially enclosed to the ground, there is a minimal draft of spray material from the device.

The sprayer is at its maximum force, and minimum stream just as it leaves the nozzle 20. Any head-on wind will not disturb the spray direction firstly, because of the force with which the spray material leaves the nozzle and, secondly because of the construction of the device.

The flange 34, vertically positioned in front of the opening 24 causes the air converging upon its forward face along the front wall 4 and through the channel 46, to disperse upward over the nozzle. As a result of this deflection, there is a minimal effect on the spray action of the nozzle.

Once the spray stream enters the device, the stream spreads at the adjusted angles set within the nozzle. As mentioned, there is little if any wind effect within the space as the interior of the dome-like device is shielded from the wind.

The tapered side walls 38 and 40 act as partitions between spray path within the device. The spray affected area is between the side walls 38 and 40 and this allows for a controlled and effective coverage of the ground below.

On the outside of the device, the tapered walls 38 and 40 form a row of v-shaped channels 42 along the boom 12. This results in a decreased wind resistance as air flows through the channel 42 between the walls 38 and 40.

As the nozzles 20 are clearly visible above the device, they may be visually monitored at regular intervals to ensure that they are in proper working order. Should maintenance or minor repairs to the nozzles be necessary, access is made easier by the fact that they are exposed and not enclosed as in other devices.

The preferred embodiment is integrally molded from a lightweight weather-resistant plastic. As attached above it is modular and comprised of parts that are easily attached to form the elongate device. Special pieces are attached to the ends to enclose the device completely and protect the spray pattern from the wind in all directions.

The device is made of detachable parts and each part is inter connected by way of fastening means formed by the vacuum suction technique described above. The device is also suspended from or connected to the boom by attachment vacuum form part. It is understood that the embedded part may be any shape or design that would allow means for fastening thereto.

The decreased wind resistance, along with the oncoming air being directed away from the nozzle, allows the operator to spray in more turbulent wind conditions or at a higher speed for greater efficiency. The wind resistant dome-like construction disturbs a minimum volume of air when in use and eliminates the trailing updrafts which compounds the spray drift problem.

Since various modifications can be made in my invention as hereinabove described, and many apparently widely different embodiments of same made within the spirit and scope, it is intended that all matter contained in the accompanying specification shall be interpreted as illustrative only and not in a limiting sense.

We claim:

1. A field sprayer comprising a liquid supply duct, elongate frame means mounting the liquid supply duct in a substantially horizontal orientation extending longitudinally of the frame means for transportation across a field in a direction generally at right angles to the duct; a plurality of spray nozzles mounted on the duct at spaced positions therealong each arranged to direct liquid in a spray pattern generally downwardly from the duct, each of the nozzles having a nozzle tip from which the spray pattern emerges in an initial pattern portion which diverges into an opened pattern portion; and a sprayshield carried by the frame means and including a sprayshield body having walls for protecting the opened pattern portion of the spray pattern from air movement in a direction across the ground, the sprayshield body having an opening adjacent the nozzle, the opening being defined by wall edge means of the body, the walls and the wall edge means being shaped such that an imaginary substantially horizontal line extending from the nozzle tip substantially longitudinally of the frame means lies outside the sprayshield body and is free from intersection with the walls and the wall edge means of the sprayshield body, so as to allow viewing of the tip and the initial pattern portion of the spray pattern from a location outside of the sprayshield.

2. The field sprayer according to claim 1 wherein the sprayshield body includes a front wall extending forwardly and downwardly from the opening with a part of the wall edge means defined on said front wall and a rear wall extending rearwardly and downwardly from the opening with a part of the wall edge means defined on said rear wall.

3. The field sprayer according to claim 2 wherein a portion of the front wall and a portion of the rear wall at the opening are each inclined such that imaginary lines extrapolated therefrom intersect at a position above the nozzle tip so as to direct air moving upwardly of one of the front wall and the rear wall upwardly and over the nozzle tip.

4. The field sprayer according to claim 3 wherein said portions of the front and rear walls are inclined at a steeper angle to the horizontal than a main portion of the front and rear wall.

5. The field sprayer according to claim 1 wherein the wall edge means defining the opening lies in a substantially horizontal plane located at a height below that of the nozzle tip.

6. The field sprayer according to claim 1 wherein the sprayshield body comprises a front skirt portion, a rear skirt portion, each of the said skirt portions extending across a plurality of said nozzles, said sprayshield body further comprising for each of the nozzles a top portion above the skirt portions shaped to surround the spray pattern of the nozzle, said tip portion integrally attached to the skirt and comprising a front wall, a rear wall and two side walls, said front wall, rear wall and side walls defining a domed enclosure in which said side walls extend downwardly and outwardly from the opening thereby defining a substantially Y-shaped channel between the side walls of adjacent domed enclosures on the sprayshield body.

7. The field sprayer according to claim 6 wherein the front and rear walls are angled inwardly and upwardly.

8. The field sprayer according to claim 7 wherein an upper portion of each of the front and rear walls is inclined more steeply to the horizontal than a lower main portion of the respective front and rear walls.

9. The field sprayer according to claim 8 wherein the front and rear walls are smooth.

10. The field sprayer according to claim 6 wherein the side walls include ribs extending across the side portions transverse to the frame.

11. A field sprayer comprising a liquid duct, frame means mounting the liquid supply duct in a substantially horizontal orientation for transportation across a field in a direction generally at right angles to the duct; a plurality of spray nozzles mounted on the duct at spaced positions therealong, each arranged to direct liquid in a spray pattern downwardly from the duct, each of the nozzles having a nozzle tip from which the spray pattern emerges in an initial pattern portion which diverges into an opened pattern portion; and a sprayshield carried by the frame means and including a sprayshield body having a front wall extending forwardly and downwardly from a position adjacent the nozzle and a rear wall extending rearwardly and downwardly from a position adjacent the nozzle for protecting the opened pattern portion of the spray pattern from air movement in a direction across the ground, the sprayshield body having an opening at a top edge of the front and rear walls, the opening being defined by wall edge means of the front and rear walls respectively, the wall edge means of at least the front wall being arranged at a height lower than that of said nozzle tip so as to allow viewing of the tip and the initial pattern portion of the spray pattern from a location outside of the sprayshield.

12. The field sprayer according to claim 11 wherein a portion of the front wall and a portion of the rear wall at the opening are each inclined such that imaginary lines extrapolated therefrom intersect at a position above the nozzle tip so as to direct air moving upwardly of one of the front wall and the rear wall upwardly and over the nozzle tip.

13. The field sprayer according to claim 11 wherein said portions of the front and rear walls are inclined at a steeper angle to the horizontal than a main portion of the front and rear wall.

14. The field sprayer according to claim 11 wherein the wall edge means defining the opening lies in a substantially horizontal plane located at a height below that of the nozzle tip.

15. A field sprayer comprising a liquid supply duct, elongate frame means mounting said liquid supply duct in a substantially horizontal orientation extending longitudinally of the frame means for transportation across a field in a direction generally at right angles to the duct; a plurality of spray nozzles mounted on the duct at spaced positions therealong, each arranged to direct liquid in a spray pattern generally downwardly from the duct, each of the nozzles having a nozzle tip from which the spray pattern emerges; and a sprayshield body having walls for protecting the spray pattern from air movement in a direction across the ground, the sprayshield body comprising a front skirt portion, a rear skirt portion, each of the said skirt portions extending across a plurality of said nozzles, said sprayshield body further comprising for each of the nozzles a top portion above the skirt portions shaped to surround the spray pattern of the nozzle, said top portion integrally attached to the skirt and comprising a front wall, a rear wall and two side walls, said front wall, rear wall and side walls defining a domed enclosure having an opening in which said side walls extend downwardly and outwardly from the opening thereby defining a substantially V-shaped channel between the side walls of adjacent domed enclosures on the sprayshield body.

16. The field sprayer according to claim 15 wherein the front and rear walls are angled inwardly and upwardly.

17. The field sprayer according to claim 16 wherein an upper portion of each of the front and rear walls is inclined more steeply to the horizontal than a lower main portion of the respective front and rear walls.

18. The field sprayer according to claim 17 wherein the front and rear walls are smooth.

19. The field sprayer according to claim 15 wherein the side walls include ribs extending across the side portions transverse to the frame.

* * * * *